(12) United States Patent
Rotchford et al.

(10) Patent No.: US 10,191,874 B2
(45) Date of Patent: Jan. 29, 2019

(54) METHOD AND APPARATUS FOR PROVIDING USB POWER DELIVERY NEGOTIATED THROUGH A DEDICATED TRANSMISSION CHANNEL

(71) Applicant: Microchip Technology Incorporated, Chandler, AZ (US)

(72) Inventors: Christian Rotchford, Phoenix, AZ (US); John Sisto, Lynbrook, NY (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 19 days.

(21) Appl. No.: 15/387,382

(22) Filed: Dec. 21, 2016

(65) Prior Publication Data

US 2017/0177523 A1 Jun. 22, 2017

Related U.S. Application Data

(60) Provisional application No. 62/271,015, filed on Dec. 22, 2015.

(51) Int. Cl.
*G06F 1/00* (2006.01)
*G06F 13/38* (2006.01)
*G06F 3/05* (2006.01)
*G06F 13/40* (2006.01)
(Continued)

(52) U.S. Cl.
CPC .............. *G06F 13/385* (2013.01); *G06F 1/32* (2013.01); *G06F 1/3203* (2013.01); *G06F 3/05* (2013.01); *G06F 13/4022* (2013.01); *G06F 13/4282* (2013.01)

(58) Field of Classification Search
USPC ............................... 710/14, 69–71, 300–304
See application file for complete search history.

(56) References Cited

U.S. PATENT DOCUMENTS

| 5,675,813 | A | 10/1997 | Holmdahl | 713/310 |
| 5,784,581 | A | 7/1998 | Hannah | 710/110 |
| 5,845,329 | A | 12/1998 | Onishi et al. | 711/157 |

(Continued)

FOREIGN PATENT DOCUMENTS

| EP | 2924584 A2 | 9/2015 | G06F 13/42 |
| EP | 2930588 A1 | 10/2015 | G06F 1/26 |

(Continued)

OTHER PUBLICATIONS

International Search Report and Written Opinion, Application No. PCT/US2016/068305, 10 pages, dated Mar. 23, 2017.

(Continued)

*Primary Examiner* — Raymond N Phan
(74) *Attorney, Agent, or Firm* — Slayden Grubert Beard PLLC

(57) ABSTRACT

A USB interface to provide power delivery negotiated through a dedicated transmission channel includes a transmitter circuit including a digital-to-analog converter having an output coupled with an input of a transmission filter, a receiver circuit including an analog-to-digital converter having an input coupled with an output of a receiving filter, and a switching circuit configured in an operating mode of the USB interface to connect an output of the transmission filter and an input of the receiving filter to a connection node of the dedicated transmission channel.

20 Claims, 10 Drawing Sheets

(51) Int. Cl.
*G06F 13/42* (2006.01)
*G06F 1/32* (2006.01)

(56) References Cited

U.S. PATENT DOCUMENTS

| | | | |
|---|---|---|---|
| 6,119,190 A | 9/2000 | Garney | 710/310 |
| 6,147,682 A | 11/2000 | Kim | 345/211 |
| 6,205,501 B1 | 3/2001 | Brief et al. | 710/100 |
| 6,308,239 B1 | 10/2001 | Osakada et al. | 710/316 |
| 6,408,351 B1 | 6/2002 | Hamdi et al. | 710/63 |
| 6,408,367 B2 | 6/2002 | Achilles et al. | 711/157 |
| 6,516,205 B1 | 2/2003 | Oguma | 455/557 |
| 6,532,512 B1 | 3/2003 | Torii et al. | 710/316 |
| 6,549,966 B1 | 4/2003 | Dickens | 710/300 |
| 6,601,109 B1 | 7/2003 | Bealkowski et al. | 709/250 |
| 6,704,824 B1 | 3/2004 | Goodman | 710/300 |
| 6,725,302 B1 | 4/2004 | Benayoun et al. | 710/62 |
| 6,732,218 B2 | 5/2004 | Overtoom et al. | 710/313 |
| 6,957,287 B2 | 10/2005 | Lou et al. | 710/72 |
| 7,040,823 B2 | 5/2006 | Silverbrook | 400/419 |
| 7,073,010 B2 | 7/2006 | Chen et al. | 710/313 |
| 7,093,057 B2 | 8/2006 | Choi | 710/313 |
| 7,246,189 B2 | 7/2007 | Ulenas | 710/305 |
| 7,346,728 B1 | 3/2008 | Jackson | 710/313 |
| 7,433,991 B2 | 10/2008 | Fujita et al. | 710/316 |
| 7,478,191 B2 | 1/2009 | Wurzburg et al. | 710/316 |
| 7,523,243 B2 | 4/2009 | Bohm et al. | 710/305 |
| 7,627,708 B2 | 12/2009 | Bohm et al. | 710/305 |
| 7,711,006 B2 | 5/2010 | Dries et al. | 370/474 |
| 9,772,367 B2 * | 9/2017 | Kesterson | G01R 31/043 |
| 9,806,547 B2 * | 10/2017 | Carre | H02J 7/0052 |
| 2006/0056401 A1 | 3/2006 | Bohm et al. | 370/360 |
| 2006/0059293 A1 | 3/2006 | Wurzburg et al. | 710/313 |
| 2006/0227759 A1 | 10/2006 | Bohm et al. | 370/351 |
| 2015/0269102 A1 * | 9/2015 | Inha | G06F 13/385 |
| | | | 710/14 |
| 2015/0293514 A1 * | 10/2015 | Tupala | G06F 1/266 |
| | | | 700/295 |
| 2015/0295488 A1 * | 10/2015 | Shen | H02M 1/32 |
| | | | 363/50 |
| 2016/0188514 A1 * | 6/2016 | Forghani-Zadeh | G06F 13/385 |
| | | | 710/313 |
| 2016/0364360 A1 * | 12/2016 | Lim | G06F 13/385 |

FOREIGN PATENT DOCUMENTS

| | | | | |
|---|---|---|---|---|
| GB | 2352540 A | 1/2001 | | G06F 13/40 |
| JP | 2003256351 U | 9/2003 | | G06F 13/14 |
| WO | 2005/018124 A1 | 2/2005 | | H04J 3/24 |

OTHER PUBLICATIONS

Anonymous, "Universal Serial Bus Specification rv. 2.0," 650 pages, Apr. 27, 2000.

Anonymous, "On-The-Go Supplement to the USB 2.0 Specification, Rev. 1.0," 74 pages, Dec. 18, 2001.

Anonymous, "Microsoft Computer Dictionary, 5th Edition," 3 pages, 2002.

Hyde, John, "USB Design by Example: A Practical Guide to Building I/O Devices," Intel Press: Engineer to Engineer Communication, 30 pages, Apr. 2002.

Anonymous, "CY7C65640: TetraHub™ High-Speed USB Hub Controller," Cypress Semiconductor Corporation, 25 pages, Dec. 5, 2002.

Axelson, Jan, "USB Complete: Everything you Need to Develop Custom USB Peripherals, Third Edition," Lakeview Research LLC, 560 Pages, 2005.

Excerpts of Prosecution File History of Abandoned U.S. Appl. No. 10/940,406, 289 Pages, Apr. 4, 2010.

Excerpts of Prosecution File History of Abandoned U.S. Appl. No. 11/100,299, 165 Pages, Jan. 4, 2010.

Excerpts of Prosecution File History of Abandoned U.S. Appl. No. 11/424,179, 190 Pages, Jan. 4, 2010.

* cited by examiner

METHOD AND APPARATUS FOR PROVIDING USB POWER DELIVERY NEGOTIATED THROUGH A DEDICATED TRANSMISSION CHANNEL

RELATED PATENT APPLICATION

This application claims priority to commonly owned U.S. Provisional Patent Application No. 62/271,015; filed Dec. 22, 2015; which is hereby incorporated by reference herein for all purposes.

TECHNICAL FIELD

The present disclosure relates to Universal Serial Bus (USB) interfaces, in particular to a method and an apparatus for tuning USB power delivery signals.

BACKGROUND

The USB Type-C cable is capable of supplying fast data transfer speeds of up to 10 Gb/s. It can provide 100 W of continuous power flow. Furthermore, it can provide ultra-high bandwidth video capability made available. Each of these can happen through alternate modes. all in parallel with a single connection.

SUMMARY

Embodiments of the present disclosure include a USB interface. The USB interface may provide power delivery negotiated through a dedicated transmission channel. The USB interface may include a transmitter circuit including a digital-to-analog converter having an output coupled with an input of a transmission filter. In combination with any of the above embodiments, the USB interface may include a receiver circuit including an analog-to-digital converter having an input coupled with an output of a receiving filter. In combination with any of the above embodiments, the USB interface may include a switching circuit configured in a first operating mode of the USB interface to connect an output of the transmission filter and an input of the receiving filter to a first connection node of the dedicated transmission channel. In combination with any of the above embodiments, in a second operating mode of the USB interface the switching circuit is configured to connect the output of the transmission filter and the input of the receiving filter to a second connection node of the dedicated transmission channel. In combination with any of the above embodiments, the second mode is a receiver built-in self-test mode. In combination with any of the above embodiments, in a third operating mode of the USB interface the switching circuit is configured to connect only the output of the transmission filter to the first connection node of the dedicated transmission channel. In combination with any of the above embodiments, the third mode is a port detection built-in self-test mode. In combination with any of the above embodiments, in a fourth operating mode of the USB interface a cable connects the first and a second connection node of the dedicated transmission channel and the switching circuit is configured to connect the output of the transmission filter to the first connection node and the input of the receiving filter to the second connection node. In combination with any of the above embodiments, the fourth mode is a cable load built-in self-test mode. In combination with any of the above embodiments, the first connection node is a CC1 pin and a second connection node is a CC2 pin of a type-C USB connector. In combination with any of the above embodiments, a port detection circuit is coupled with the first connection node and a second connection node. In combination with any of the above embodiments, the first mode is a normal transmit and receive communication mode.

In combination with any of the above embodiments, a computer, mobile device, electronic device, system, USB device, USB master, USB hub, circuit, semiconductor device, or other apparatus may include such a USB interface.

In combination with any of the above embodiments, a method may be performed. A method of operating a USB interface to provide power delivery negotiated through a dedicated transmission channel can include outputting an output signal through a transmitter circuit, including outputting the output signal through a digital-to-analog converter and then through a transmission filter. In combination with any of the above embodiments, the method may include receiving an input signal through a receiver circuit, including receiving the signal through a receiving filter and an analog-to-digital converter. In combination with any of the above embodiments, the method may include, in a first operating mode, connecting an output of the transmission filter and an input of the receiving filter to a first connection node of the dedicated transmission channel. In combination with any of the above embodiments, the method may include, in a second operating mode, connecting the output of the transmission filter and the input of the receiving filter to a second connection node of the dedicated transmission channel. In combination with any of the above embodiments, the second mode is a receiver built-in self-test mode. In combination with any of the above embodiments, the method may include, in a third operating mode, connecting only the output of the transmission filter to the first connection node of the dedicated transmission channel. In combination with any of the above embodiments, the third mode is a port detection built-in self-test mode. In combination with any of the above embodiments, the method may include, in a fourth operating mode, connecting the first and a second connection node of the dedicated transmission channel and connecting the output of the transmission filter to the first connection node and the input of the receiving filter to the second connection node. In combination with any of the above embodiments, the fourth mode is a cable load built-in self-test mode. In combination with any of the above embodiments, the method may include connecting to a CC1 pin and a CC2 pin of a type-C USB connector. In combination with any of the above embodiments, the method may include performing port detection with a circuit coupled with the first connection node and a second connection node. In combination with any of the above embodiments, the first mode is a normal transmit and receive communication mode.

DETAILED DESCRIPTION

Figure 1:
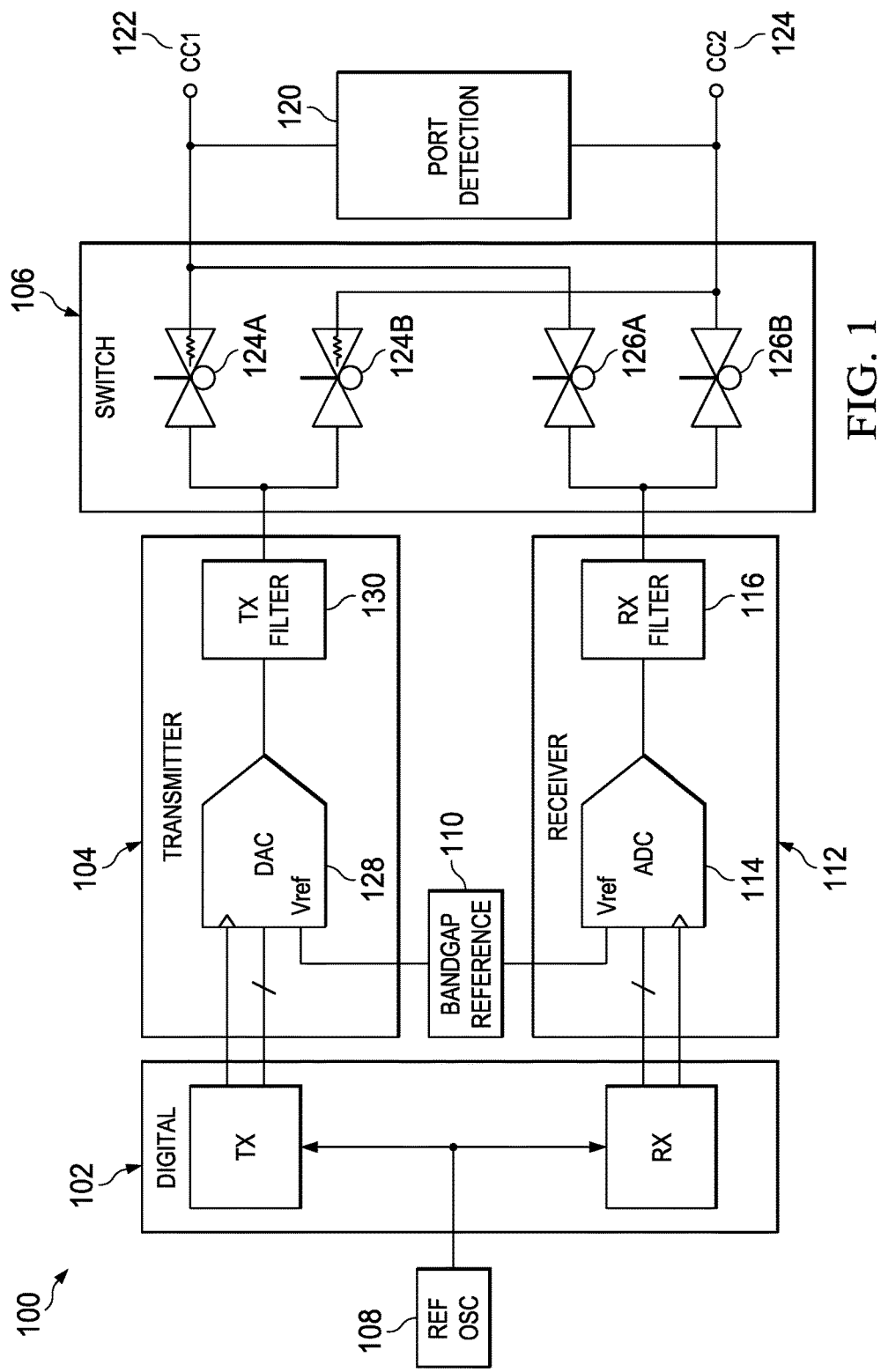
FIG. 1 illustrates an example of a system for providing an architecture for interfacing with USB using a Direct Digital Synthesizer, in accordance with embodiments of the present disclosure.

FIG. 1 illustrates an example of a system 100 for providing an architecture for interfacing with USB using a Direct Digital Synthesizer (DDS), in accordance with embodiments of the present disclosure. System 100 may be configured to provide tuning USB power delivery signals. In one embodiment, the architecture may provide interfacing using USB Type-C. System 100 may be implemented in any suitable USB interface, such as in a USB device, USB master, or USB hub. System 100 may be connected to another USB interface in a USB device, USB master, or USB hub through a USB cable. System 100 may interface with digital logic 102. Digital logic 102 may represent transmission (Tx) and reception (Rx) logic that implements substantive elements of a USB device, USB master, or USB hub. Digital logic 102 may utilize system 100 to communicate with other USB elements, test itself, or evaluate other USB components.

FIG. 1 illustrates example digital and analog circuitry that may be used to implement system 100. For example, system 100 may include a reference oscillator 108 communicatively coupled to elements of system 100 or digital logic 102 to clock operations. In one embodiment, reference oscillator 108 may generate clock signals at a rate of 48 MHz Digital logic 102 may be communicatively coupled to other USB elements through pins such as CC1 122 and CC2 124. Pins CC1 122, CC2 124 may be referred to as configuration channel (CC) pins. In order to correctly communicate in different modes to such USB elements, system 100 may include a DDS architecture including a transmitter circuit 104, a receiver circuit 112, a switch 106, a port detection circuit 120, and a bandgap reference 110.

Transmitter circuit 104 may include a digital-to-analog converter (DAC) 128 communicatively coupled to a transmission filter 130. DAC 128 may be implemented with a resolution of ten bits and a voltage spread of 1.8 V. DAC 128 may operate on a clock signal received from digital logic 102. The clock signal may be, for example, the frequency of reference oscillator 108 divided in half, thus, 24 MHz DAC 128 may receive as input ten data lines from digital logic 102, representing data that is to be transmitted out of pins CC1 122, CC2 124, or otherwise used for test or evaluation purposes. DAC 128 may perform normalization or calculation of an output ceiling by receipt of a voltage reference. Such a reference may include bandgap reference 110. The value of bandgap reference 110 may depend upon the particular die or device upon which system 100 is implemented, or may be set by digital logic 102. In one embodiment, bandgap reference 110 may be 1.2 V, plus or minus 2 mV. Transmitter circuit 104 may also include a Tx filter 130. Tx filter 130 may be implemented with, for example, two poles and a range greater than 3.33 MHz Receiver circuit 112 may include an analog-to-digital converter (ADC) 114. ADC 114 may be implemented, in one embodiment, with a single bit. In such an embodiment, ADC 114 may be implemented as a comparator. The comparison may be made against a reference voltage input. The reference voltage input may include, for example, bandgap reference 110. Thus, ADC 114 may produce a single line of data (such as a zero or one logical voltage level) if the analog signal received from one of pins CC1 122, CC2 124 is above or below the reference voltage provided by bandgap reference 110. ADC 114 may output its digital lines to digital logic 102, which may interpret the data accordingly and make decisions based upon its value. ADC 114 may include a voltage range of 0.175-1.625 V, and operate at a clock speed provided by digital logic, such as 25 MHz Receiver circuit 112 may also include an Rx filter 116. Rx filter 116 may be implemented with, for example, one pole and a range of less than 10 MHz Transmitter circuit 104 and receiver circuit 112 may interface with pins CC1 122 and CC2 124 to output signals (converted from digital data generated by digital logic 102) and to receive signals (and convert them to digital data and provide them to digital logic 102). The particular routing of signals between transmitter circuit 104, receiver circuit 112 and pins CC1 122, CC2 124 may be handled by switch 106. Switch 106 may route signals between transmitter circuit 104 and one or both of pins CC1 122, CC2 124. Furthermore, switch 106 may route signals between one or both of pins CC1 122, CC2 124 and receiver circuit 10. The particular routes selected by switch 106 may depend upon the mode of operation selected by digital logic 102. Digital logic 102 may control switch 106 to route signals accordingly. When operating, switch 107 may include a resistance between 33 and 75 ohms.

In one embodiment, switch 106 may be implemented by one or more transmission gates. For example, switch 106 may include transmission gates 124A, 124B connected in parallel with each other to transmitter circuit 104. Transmission gate 124A may be connected to CC1 122 and port detection circuit 120. Transmission gate 124B may be connected to CC2 124 and the other side of port detection circuit 120. Transmission gates 124A, 124B may include transmission gates with a fixed, 50-ohm resistance. Switch may further include transmission gates 126A, 126B, connected in parallel with each other to receiver circuit 112. Transmission gate 126B may be connected to CC2 124 and port detection circuit 120. Transmission gate 126A may be connected to CC1 122 and the other side of port detection circuit 120. In one embodiment, transmission gates 126A, 126B might not have fixed, 50-ohm resistance values. Transmission gate 124B may be connected to transmission gate 126B. Furthermore, transmission gate 124A may be connected to transmission gate 126A. Transmission gates in switch 106 may be implemented as relays that can conduct in one or both directions or block in or both directions. The transmission gates may be implemented by transistor-based switches. Individual ones of the transmission gates may be enabled, disabled, or configured to flow in particular directions according to desired flow of signals in various modes of operation. In other embodiments, switch 106 may be implemented by suitable switch fabrics.

Port detection circuit 120 may be configured to determine whether any elements are communicatively coupled to one or both of pins CC1 122, CC2 124, or whether any load is present thereon. Port detection circuit 120 may be implemented by, for example, a voltage divider implemented with resistors or transistors. Port detection circuit 120 may function by, for example, sampling CC1 122 from CC2 124, or vice-versa. Port detection circuit 120 may include a voltage range of 2.5 V, plus or minus 2.5 mV, although any suitable voltage range for expected differentials between the pins may be used.

Any suitable mode of operation may be enabled by system 100. In one embodiment, system 100 may provide a tunable USB power delivery (PD) transmitter signal for communication. In another embodiment, system 100 may provide built-in self-test (BIST) capability. According to various USB specifications, such as USB 3.1, PD communication packets must be provided at various specified voltage levels and specific rise and fall rates to be recognized as particular data signals.

A USB Type-C cable attached to system 100 may make use of pins CC1 122, CC2 124. During USB Type-C operation, resistors may be attached to pins CC1 122, CC2 124 in various configurations. These various configurations may depend upon operation mode of USB. For example, the application being performed by a USB element connected to system 100 may be configured to operate as a downstream facing port (DFP), upstream facing port (UFP), or an electronically marked/active cable. For DFP, pull-up resistors may be applied. For UFP, pull-down resistors may be applied. For electronically active cables, pull-down resistors may be applied. These may each affect the signals to be sent by system 100.

As discussed above, system 100 may provide PD communication packets at the voltage levels at rates required in USB specifications. However, the particular values of resistance of elements connected to system 100 might be initially unknown. Moreover, the USB element connected to system 100 might have an unknown ground reference. The ground reference used by a USB element might be the same as that used by system 100. However, if the ground reference is higher or lower than that used by system 100, system 100 might need to adjust its output voltage level in order to correctly communicate.

Pins CC1 122, CC2 124 may be constantly monitored by system 100 to determine various operations, such as a cable being attached or removed, determining the orientation of a cable, and advertisements above current capability.

PD messages may be defined by USB specifications for power delivery. USB Power Delivery 2.0 refers to a single wire protocol (on a CC wire). Although termed "USB Power Delivery", system 100 may provide services more than just power negotiations. Other capabilities of USB Type-C cable may be performed by system 100 using PD messaging. PD messaging may occur independently of USB 2.0/3.0/3.1 data and may be used for port-to-port negotiation of power roles, voltage level, maximum supplying current capability, data roles, and alternate modes. Port-to-powered cable communication may also be handled by system 100 using USB PD. USB OD messaging allows power configuration of a USB connection to be dynamically modified. The default 5 V voltage on a bus can be reconfigured up to any level up to 20 V. The maximum current supplying capability can also be raised to a maximum of 5 A with a 100 W compatible electronically marked USB PD Type-C cable. The default roles (Provider or Consumer) can also be dynamically swapped at any time if both ports support dual power role functionality and the port accepts the swap request.

Digital logic 102 may be responsible for control of other elements of system 100, implementing the Type-C signaling protocol outputs, and detecting and interpreting the protocol inputs. Digital logic 102 may include multiple registers programmed with appropriate signaling profiles, corresponding to inputs and outputs to apply to system 100 to achieve desired communication. Moreover, digital logic 102 may include ramping up and ramping down profiles. Upon feedback of a received signal input, an algorithm would then adjust these profiles for different output signal offsets or ramp rates. Digital logic 102 may be ultimately controlled by drivers or software.

Figure 2:
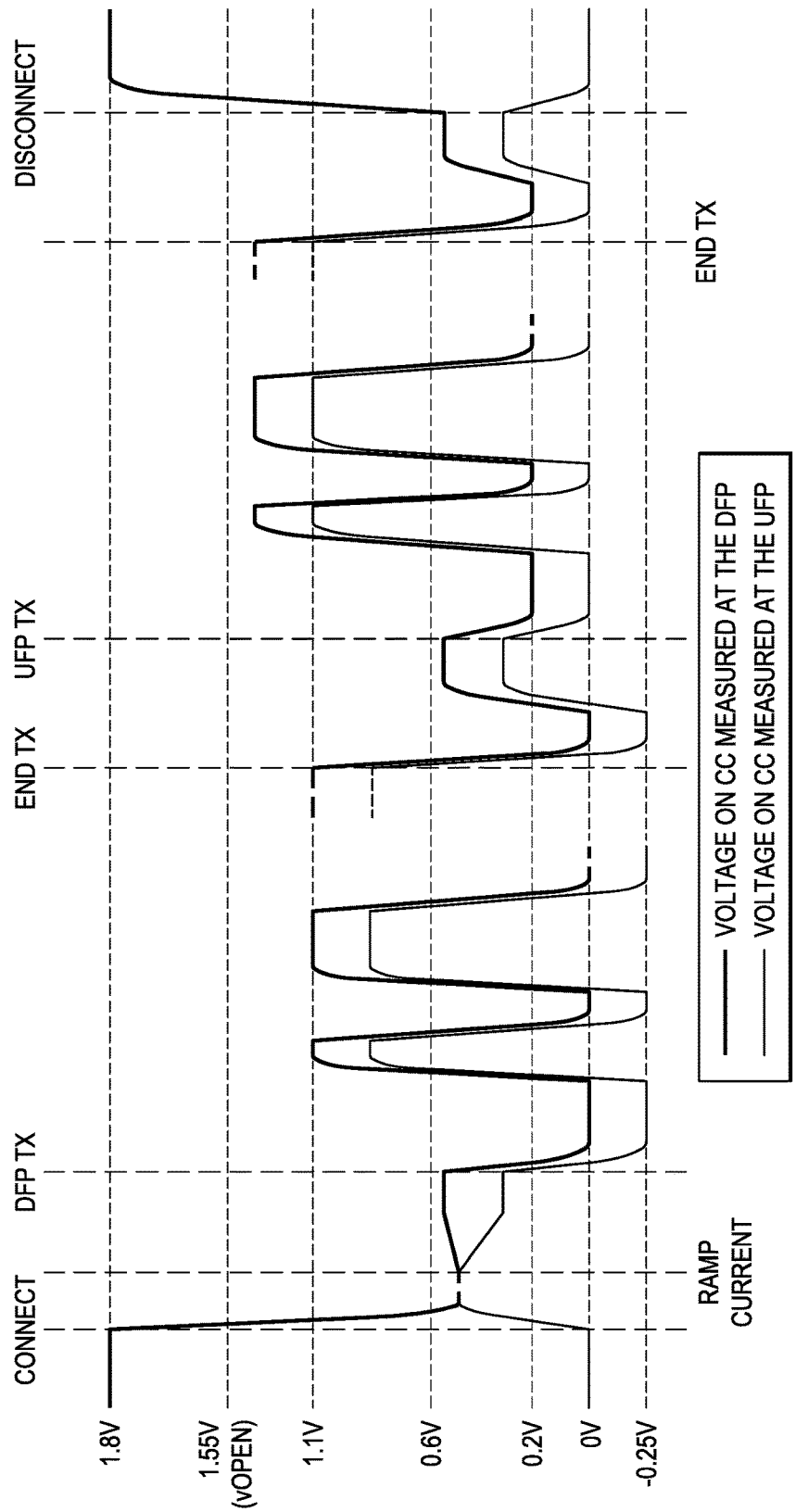
FIG. 2 illustrates PD signaling allowed for the USB 3.1 PD Standard.

FIG. 2 illustrates PD signaling allowed for the USB 3.1 PD Standard. The USB 3.1 PD Standard specifies a maximum signal level of 1.2 V, but allows for ground noise levels from −250 mV to +200 mV. Accordingly, system 100 may need to transmit a USB 3.1 PD data packet across a cable with an unknown ground reference.

Returning to FIG. 1, digital logic 102 may output signals through system 100 to an element attached to system 100. The output signals, after matriculation through the element and return to system 100 as input signals, may be used to characterize the ground reference of the element attached to system 100. Consequently, in subsequent communication with the element attached to system 100, output communication signals generated by digital logic 102 may be adjusted to account for the difference in ground reference values. For example, the signals subsequently output from digital logic 102 may be shifted down as much as 200-250 mV up or down.

Other systems may not use a combination of DACs and filters, but instead use a two-level driver as an off-chip line drivers. However, such solutions are not flexible to signal level adjustments or maintaining specific rise and fall rates without extended off-chip loading profile characterization.

System 100, by use of a DDS transmitter has the benefit of using a fixed-frequency, stable reference clock for receipt and transmission of data. System 100 may produce quantized, discrete-time outputs. DAC 128 may produce analog waveforms with voltage and frequency precision. Reconstruction filtering by Tx filter 130 may reject spectral replicas. System 100 may be capable of producing Tx waveforms to meet Tx mask specifications, BIST waveforms to test Rx mask sensitivity, And BIST-specific voltages to test port detection accuracy.

Figure 3:
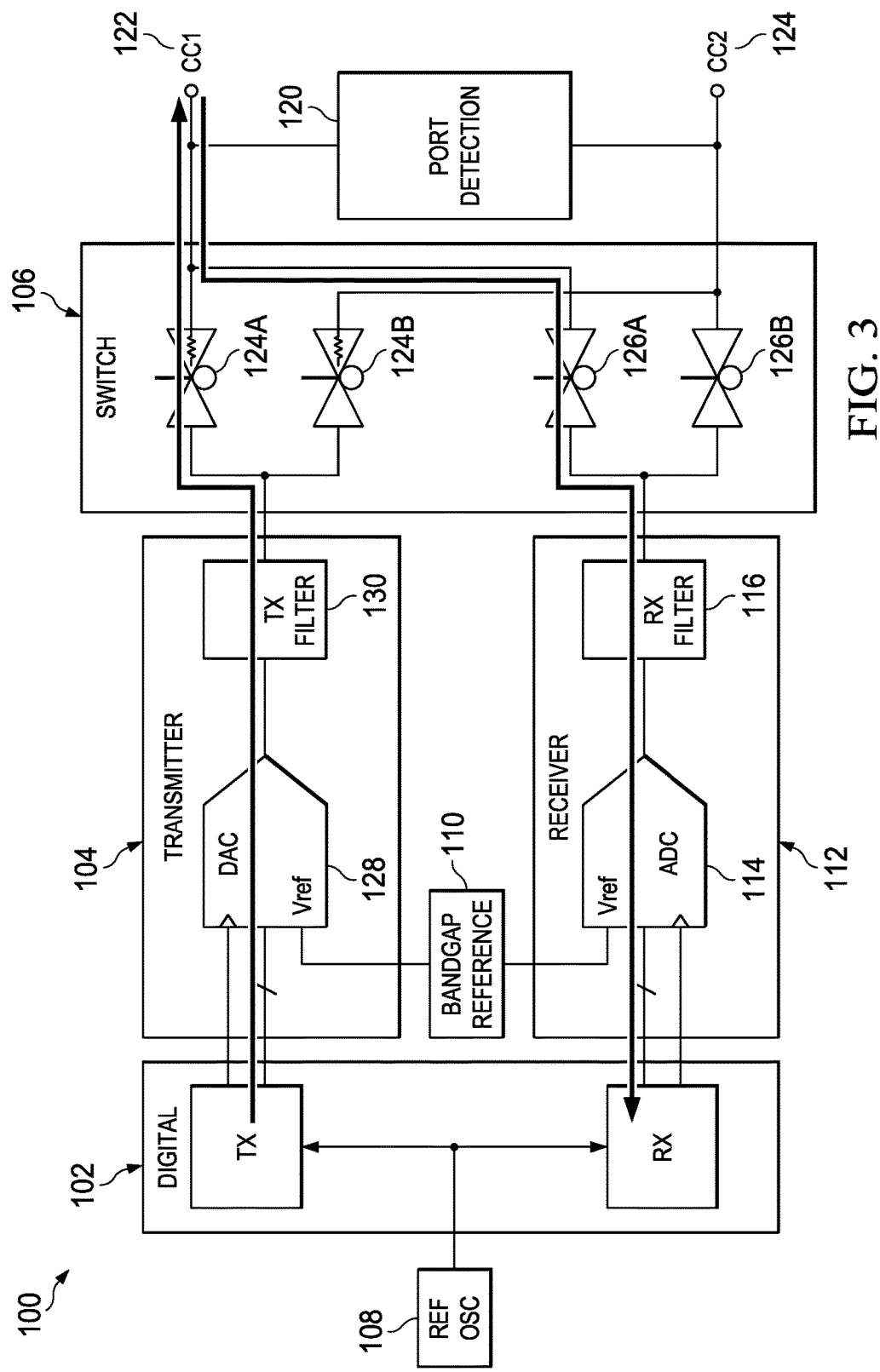
FIG. 3 is an illustration of switching inputs and outputs for a system to perform normal transmission and reception, according to embodiments of the present disclosure.

FIG. 3 is an illustration of switching inputs and outputs for system 100 to perform normal transmission and reception, according to embodiments of the present disclosure. Switch 106 may route the output of transmitter circuit 104 to pin CC1 122 and back to receiver circuit 112 according the flow shown in FIG. 3. The transmission gates of switch 106 may be so configured to perform such a flow, wherein transmission gate 124A allows flow from transmitter circuit 104 to pin CC1 122, and transmission gate 126A allows flow from pin cc1 122 to receiver circuit 112. Transmission gates 124B, 126B might be switched to disallow flow. In FIG. 3, port detection may be on. CC1 122 might be used while CC2 124 might not be used. A transmission waveform may be transmitted. Switch 106 may be in a CC1 transmit/receive mode. Receiver circuit 112 might be activated. Digital logic 102 might perform transmission and evaluation of data from USB elements attached to system 100.

Figure 4:
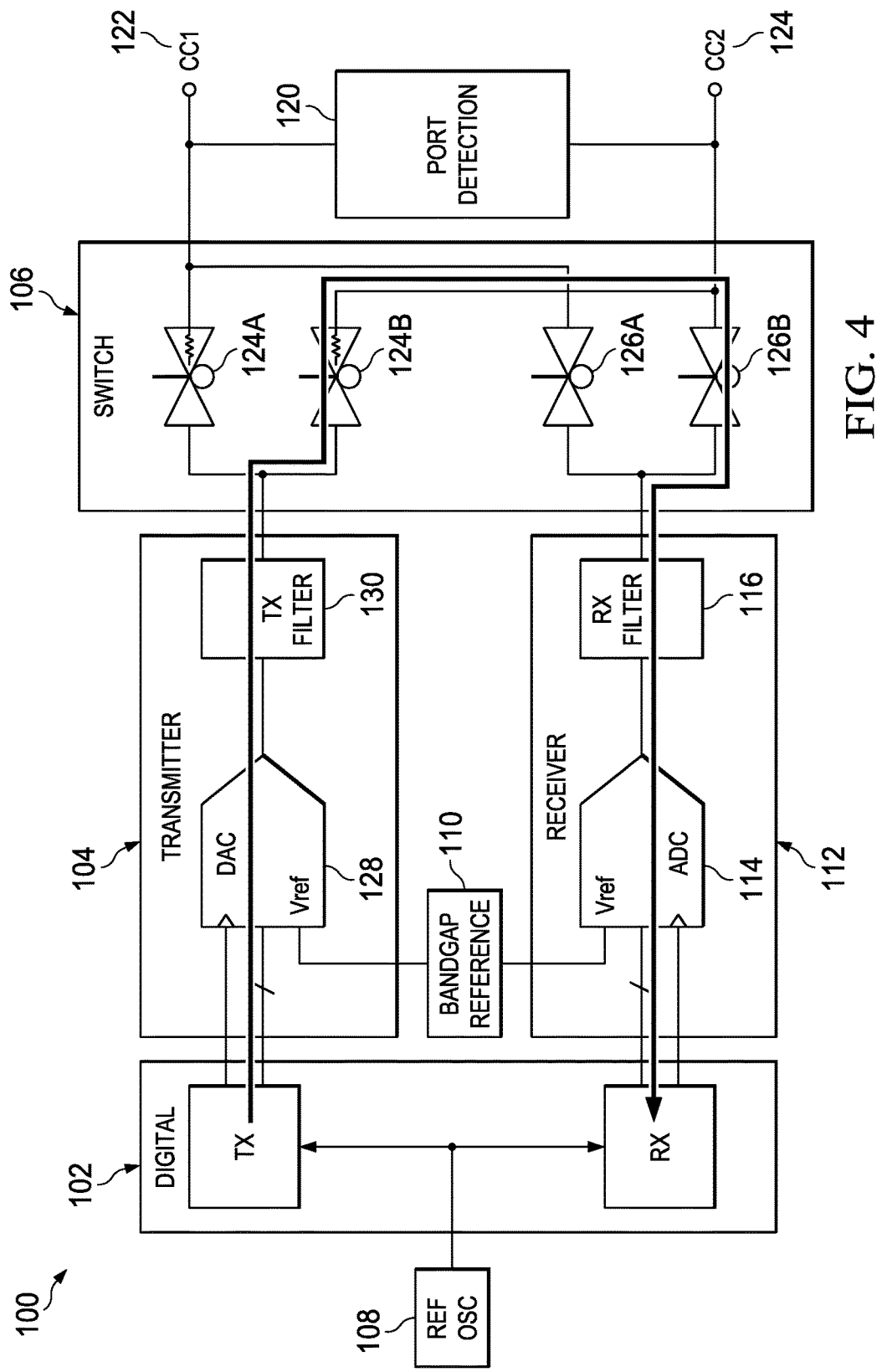
FIG. 4 is an illustration of switching inputs and outputs for a system to perform receiver built-in test, according to embodiments of the present disclosure.

FIG. 4 is an illustration of switching inputs and outputs for system 100 to perform receiver built-in test, according to embodiments of the present disclosure. Switch 106 may route the output of transmitter circuit 104 internally back to receiver circuit 112 according the flow shown in FIG. 4. The transmission gates of switch 106 may be so configured to perform such a flow, wherein transmission gate 124B allows flow from transmitter circuit 104 to transmission gate 126B, which in turn allows flow from to receiver circuit 112. Transmission gates 124A, 126A might be switched to disallow flow. In FIG. 4, port detection may be off. CC1 122 and CC2 124 might not be used and might be floating. A waveform that would be expected by receiver circuit 112 may transmitted. Switch 106 may be in a loopback mode. Receiver circuit 112 might be activated. Digital logic 102 might verify whether receiver circuit 112 correctly received and interpreted the waveform as-was sent. Receiver adjustments may be made.

Figure 5:
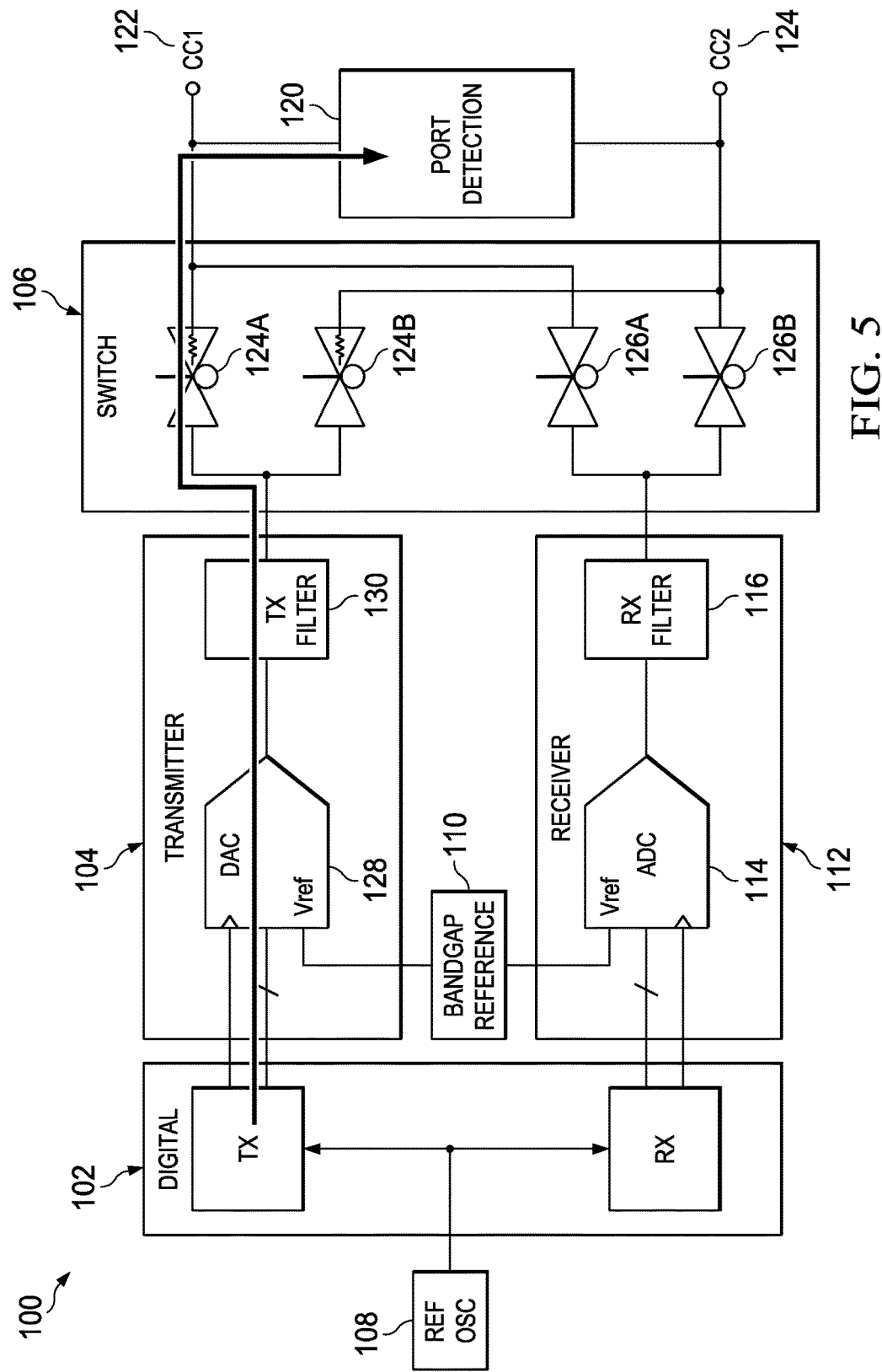
FIG. 5 is an illustration of switching inputs and outputs for a system to perform port detection built-in test, according to embodiments of the present disclosure.

FIG. 5 is an illustration of switching inputs and outputs for system 100 to perform port detection built-in test, according to embodiments of the present disclosure. Switch 106 may route the output of transmitter circuit 104 to port detection circuit 120 according the flow shown in FIG. 5. The transmission gates of switch 106 may be so configured to perform such a flow, wherein transmission gate 124A allows flow from transmitter circuit 104 to port detection circuit 120. Other transmission gates might disallow flow. In FIG. 5, port detection may be on. CC1 122 and CC2 124 might not be used and might be floating. Switch 106 may be in a CC1 transmit mode. Receiver circuit 112 might be deactivated. Digital logic 102 might verify whether port detection circuit 120 detected that the port was to be used by way of the waveform sent.

Figure 6:
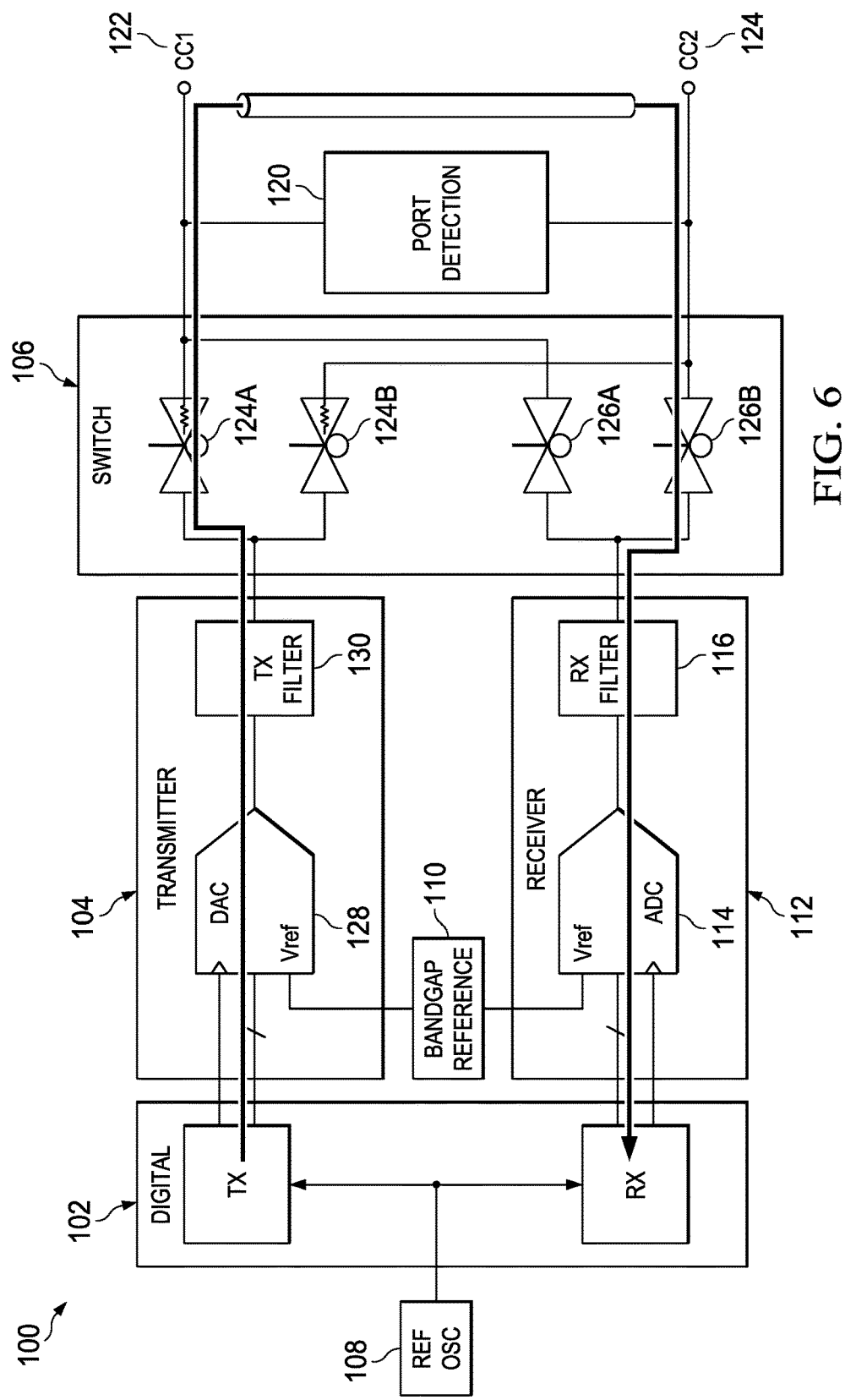
FIG. 6 is an illustration of switching inputs and outputs for a system to perform a cable load built-in test, according to embodiments of the present disclosure.

FIG. 6 is an illustration of switching inputs and outputs for system 100 to perform a cable load built-in test, according to embodiments of the present disclosure. FIG. 6 may also illustrate switching to perform BIST for any load of elements attached to system 100. Switch 106 may route the output of transmitter circuit 104 out to CC1 122 and the input of CC2 124 back to receiver circuit 112 according the flow shown in FIG. 5. The transmission gates of switch 106 may be so configured to perform such a flow, wherein transmission gate 124A allows flow from transmitter circuit 104 to CC1 122. Moreover, transmission gate 126B may allow flow from CC2 124 to receiver circuit 112. The other transmission gates may be switched to disallow flow. In FIG. 4, port detection may be on. CC1 122 and CC2 124 might be used. A transmission waveform may be transmitted to characterize the load of the cable or other element attached to system 100. Receiver circuit 112 might be activated. Digital logic 102 might calculate the load presented by the cable and adjust transmissions that follow. A profile of the cable might be stored, wherein subsequent use of the cable would not require the BIST to characterize the load of the cable.

Figure 7:
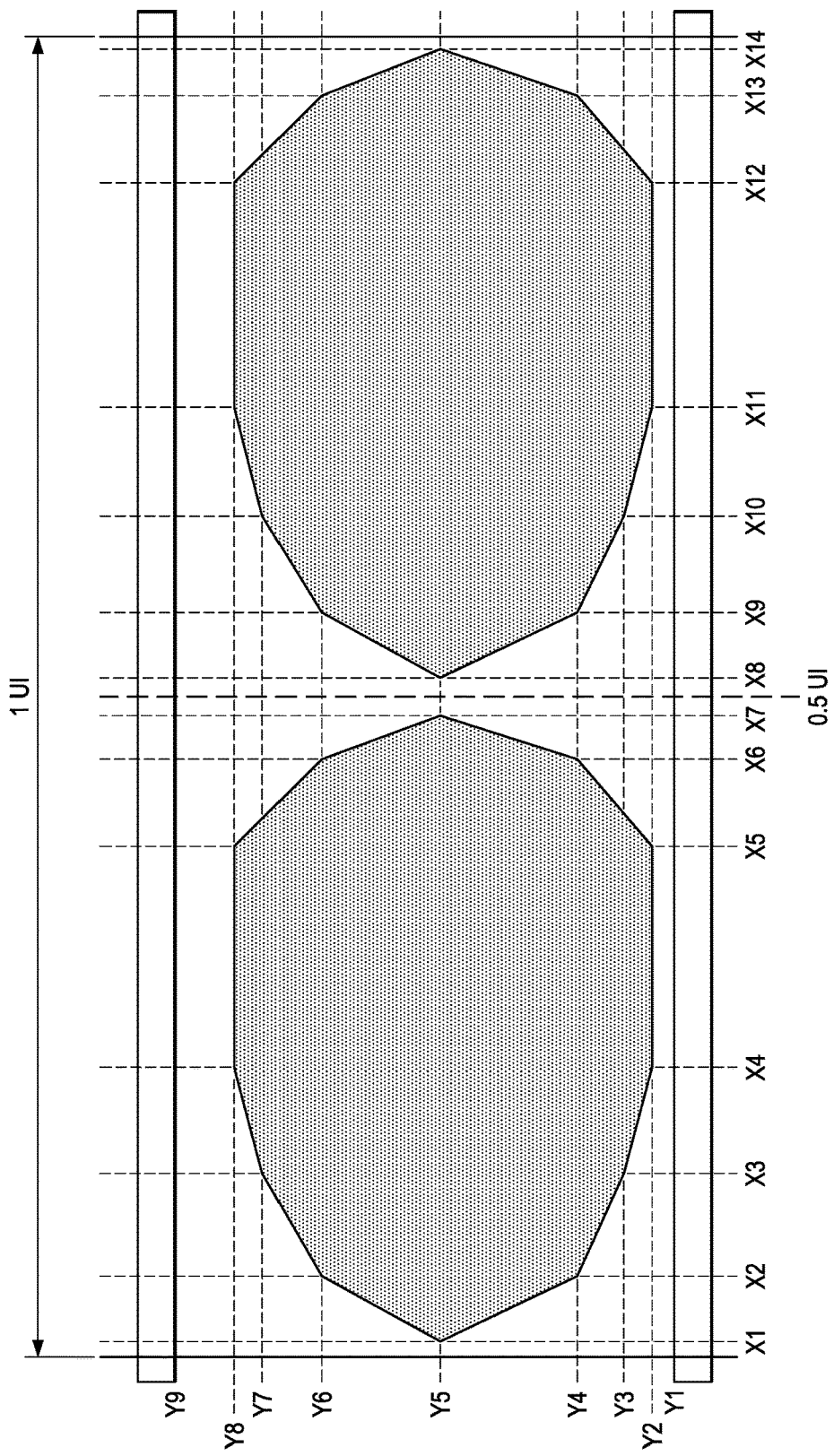
FIGS. 7 and 8 illustrate example transmission signal masks for which a system should output waveforms.
Figure 8:
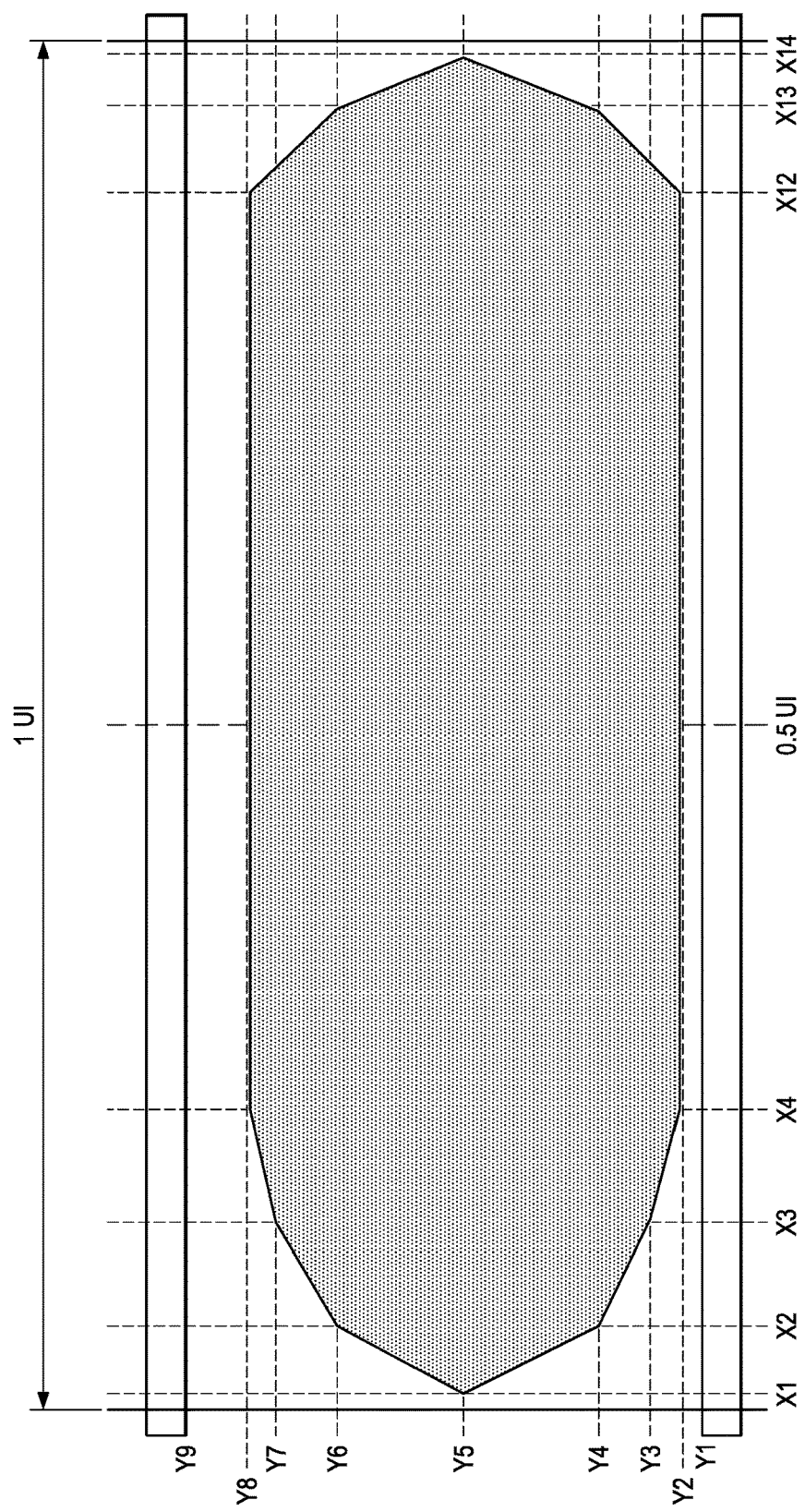

FIGS. 7 and 8 illustrate example transmission signal masks for which system 100 should output waveforms. Such masks may be defined by, for example, the USB 3.1 PD specification. The masks may graph voltage level in the y-axis versus symbol bit rates in the x-axis, expressing time. The mask specifications are:

$UI = 1/\text{SymbolBitRate} = 1/300 \text{ kHz} = 3.33 \text{ uS}+/-10\%$

WCS Transition=$(X9Tx-X6Tx)*UI=0.14*UI\rightarrow466.6$ nS+/−10%

WCS Eye Spacing=$(X8Tx-X7Tx)*UI=0.03*UI\rightarrow100$ nS+/−10%

TABLE 1

Tx Mask Specifications - x-axis

| Name | Value |
|---|---|
| X1Tx | 0.015 |
| X2Tx | 0.07 |
| X3Tx | 0.15 |

TABLE 1-continued

Tx Mask Specifications - x-axis

| Name | Value |
|---|---|
| X4Tx | 0.25 |
| X5Tx | 0.35 |
| X6Tx | 0.43 |
| X7Tx | 0.485 |
| X8Tx | 0.515 |
| X9Tx | 0.57 |
| X10Tx | 0.65 |
| X11Tx | 0.75 |
| X12Tx | 0.85 |
| X13Tx | 0.93 |
| X14Tx | 0.985 |

Unit: UI

TABLE 2

Tx Mask Specifications - y-axis

| Name | Value |
|---|---|
| Y1Tx | −0.075 |
| Y2Tx | 0.075 |
| Y3Tx | 0.15 |
| Y4Tx | 0.325 |
| Y5Tx | 0.5625 |
| Y6Tx | 0.8 |
| Y7Tx | 0.975 |
| Y8Tx | 1.04 |
| Y9Tx | 1.2 |

Unit: V

Figure 9:
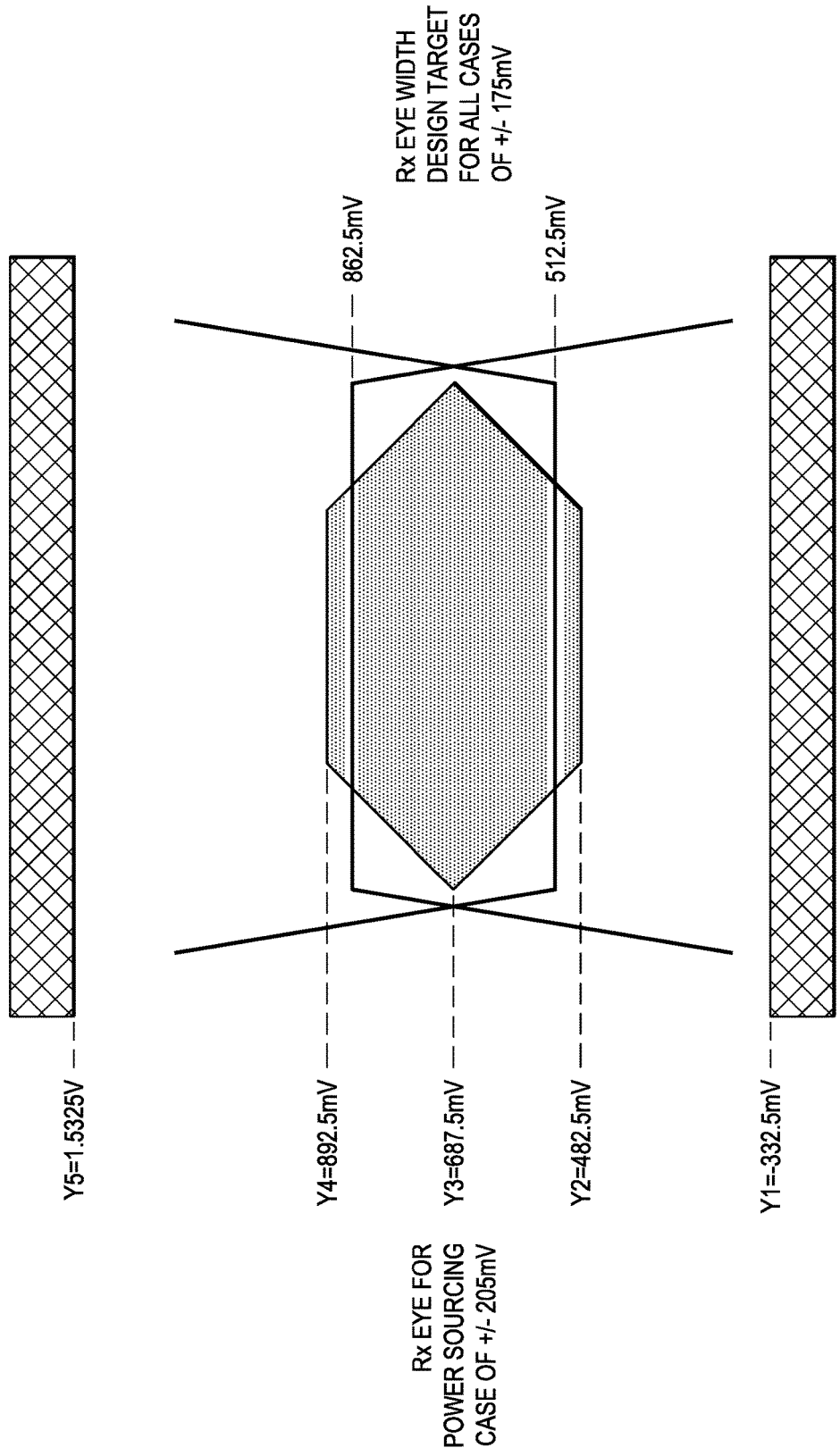
FIG. 9 illustrates example receiver signal masks for which a system should receive waveforms.

FIG. 9 illustrates example receiver signal masks for which system 100 should receive waveforms. Such masks may be defined by, for example, the USB 3.1 PD specification. The eye diagram concerns a sourcing case with Vtrip=687.5 mV+/−205 mV for power sourcing mode. Other masks are available from the USB 3.1 PD specification for sourcing cases with Vtrip=562.5 mV+/−330 mV (power neutral mode), or sourcing cases with Vtrip=437.5 mV+/−205 mV (power sinking nmode). The hysteresis design target is Vtrip=Y3+/−175 mV. This guarantees sensitivity for all cases with at least a 30 mV of margin. The results of port detection may determine which mask as dictated by the USB 3.1 PD specification.

Figure 10:
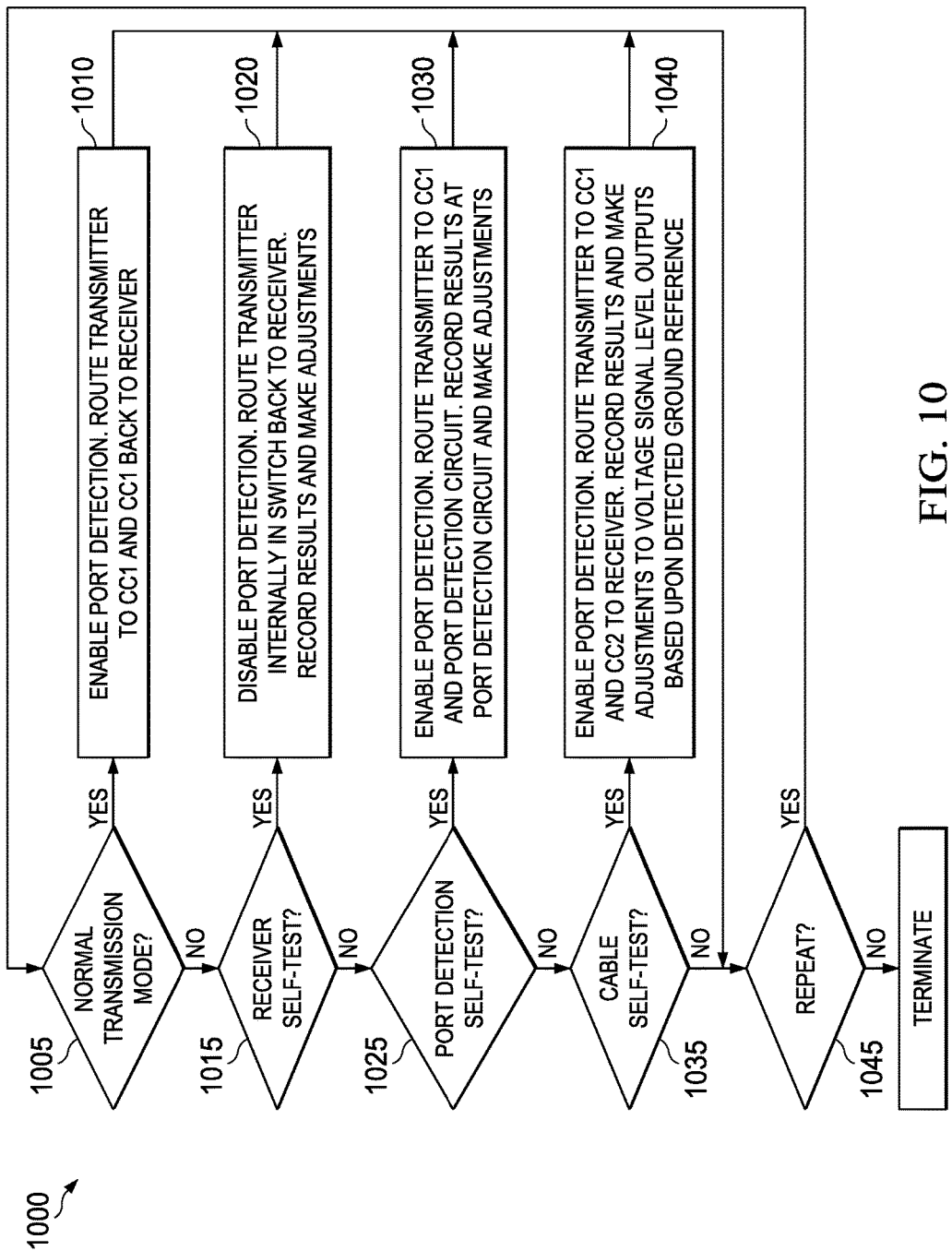
FIG. 10 illustrates an example method for tuning USB power delivery signals, according to embodiments of the present disclosure.

FIG. 10 illustrates an example method 1000 for tuning USB power delivery signals, according to embodiments of the present disclosure.

At 1005, it may be determined whether a system is to transmit USB signals, such as PD signals, in a normal transmit and receive mode. If so, method 1000 may proceed to 1010. Otherwise, method 1000 may proceed to 1015.

At 1010, port detection may be enabled. CC1 may be used while use of CC2 might be omitted. Transmit signals may be routed from a transmitter circuit to CC1, and CC1 signals might be routed back in reply to a receiver circuit. Method 1000 may proceed to 1045.

At 1015, it may be determined whether the system is to transmit in a receiver self-test mode. If so, method 1000 may proceed to 1020. Otherwise, method 1000 may proceed to 1025.

At 1020, port detection may be disabled. CC1 and CC2 might both be floating. Transmit signals, such as a test signal, may be routed from the transmitter circuit internally back to the receiver circuit. Criteria or pass-fail tests may be applied to see if the receiver successfully received signals, or interpreted signals correctly. Any needed adjustments may be made. Results may be recorded. Method 1000 may proceed to 1045.

At 1025, it may be determined whether the system is to transmit in a port detection self-test mode. If so, method 1000 may proceed to 1030. Otherwise, method 1000 may proceed to 1035.

At 1030, port detection may be enabled. CC1 and CC2 might both be floating. Transmit signals, such as a test signal, may be routed from the transmitter circuit to a port detection circuit. Criteria or pass-fail tests may be applied to see if the port detection circuit successfully received signals, or interpreted signals correctly. The port detection circuit might maintain its own routing back to controlling digital logic to send results. Any needed adjustments may be made. Results may be recorded. Method 1000 may proceed to 1045.

At 1035, it may be determined whether the system is to transmit in a cable load test mode. If so, method 1000 may proceed to 1040. Otherwise, method 1000 may proceed to 1045.

At 1040, port detection may be enabled, as well as CC1 and CC2. Transmit signals, such as a test signal, may be routed from the transmitter circuit to CC1. Resulting signals might be routed from CC2 back to the receiver circuit. Criteria or pass-fail tests may be applied to evaluate the cable or other element connected to the system. In particular, a ground reference used by the cable or other element might be characterized. Any needed adjustments may be made, such as to subsequent voltage levels of signals during communication. Results may be recorded. Method 1000 may proceed to 1045.

At 1045, method 1000 may be optionally repeated at, for example, 1005, or may terminate.

Method 1000 may be implemented by any suitable mechanism, such as by system 100 and the elements of FIGS. 1-9. Method 1000 may optionally repeat or terminate at any suitable point. Moreover, although a certain number of steps are illustrated to implement method 1000, the steps of method 1000 may be optionally repeated, performed in parallel or recursively with one another, omitted, or otherwise modified as needed. Method 1000 may initiate at any suitable point, such as at 1005.

Although example embodiments have been shown above, changes, additions, subtractions, or other permutations may be made to these embodiments without departing from the spirit and scope of the present disclosure, according to the knowledge and ability of one of ordinary skill in the art.

The invention claimed is:

1. A USB interface to provide power delivery negotiated through a dedicated transmission channel, the USB interface comprising:
   a transmitter circuit including a digital-to-analog converter having an output coupled with an input of a transmission filter;
   a receiver circuit including an analog-to-digital converter having an input coupled with an output of a receiving filter; and
   a switching circuit configured in a first operating mode of the USB interface to connect an output of the transmission filter and an input of the receiving filter to a first connection node of the dedicated transmission channel.

2. The USB interface according to claim 1, wherein in a second operating mode of the USB interface the switching circuit is configured to connect the output of the transmission filter and the input of the receiving filter to a second connection node of the dedicated transmission channel.

3. A method of operating a USB interface to provide power delivery negotiated through a dedicated transmission channel, the method comprising:
   outputting an output signal through a transmitter circuit, including outputting the output signal through a digital-to-analog converter and then through a transmission filter;
   receiving an input signal through a receiver circuit, including receiving the signal through a receiving filter and an analog-to-digital converter; and
   in a first operating mode, connecting an output of the transmission filter and an input of the receiving filter to a first connection node of the dedicated transmission channel.

4. The USB interface according to claim 1, wherein in a third operating mode of the USB interface the switching circuit is configured to connect only the output of the transmission filter to the first connection node of the dedicated transmission channel.

5. The USB interface according to claim 1, wherein in a fourth operating mode of the USB interface a cable connects the first and a second connection node of the dedicated transmission channel and the switching circuit is configured to connect the output of the transmission filter to the first connection node and the input of the receiving filter to the second connection node.

6. The USB interface according to claim 1, wherein the first connection node is a CC1 pin and a second connection node is a CC2 pin of a type-C USB connector.

7. The USB interface according to claim 1, wherein a port detection circuit is coupled with the first connection node and a second connection node.

8. The USB interface according to claim 1, wherein the first mode is a normal transmit and receive communication mode.

9. The USB interface according to claim 2, wherein the second mode is a receiver built-in self-test mode.

10. The USB interface according to claim 4, wherein the third mode is a port detection built-in self-test mode.

11. The USB interface according to claim 5, wherein the fourth mode is a cable load built-in self-test mode.

12. The method according to claim 3, further comprising, in a second operating mode, connecting the output of the transmission filter and the input of the receiving filter to a second connection node of the dedicated transmission channel.

13. The method according to claim 3, further comprising, in a third operating mode, connecting only the output of the transmission filter to the first connection node of the dedicated transmission channel.

14. The method according to claim 3, further comprising, in a fourth operating mode, connecting the first and a second connection node of the dedicated transmission channel and connecting the output of the transmission filter to the first connection node and the input of the receiving filter to the second connection node.

15. The method according to claim 3, wherein the method further comprises connecting to a CC1 pin and a CC2 pin of a type-C USB connector.

16. The method according to claim 3, further comprising performing port detection with a circuit coupled with the first connection node and a second connection node.

17. The method according to claim 3, wherein the first mode is a normal transmit and receive communication mode.

18. The method according to claim 12, wherein the second mode is a receiver built-in self-test mode.

19. The method according to claim 13, wherein the third mode is a port detection built-in self-test mode.

20. The method according to claim 14, wherein the fourth mode is a cable load built-in self-test mode.

\* \* \* \* \*